US008793215B2

(12) United States Patent
Tennant

(10) Patent No.: US 8,793,215 B2
(45) Date of Patent: Jul. 29, 2014

(54) SYSTEMS AND METHODS FOR PUBLISHING DATASETS

(75) Inventor: Robert Tennant, San Francisco, CA (US)

(73) Assignee: Recommind, Inc., San Francisco, CA (US)

( * ) Notice: Subject to any disclaimer, the term of this patent is extended or adjusted under 35 U.S.C. 154(b) by 256 days.

(21) Appl. No.: 13/153,420

(22) Filed: Jun. 4, 2011

(65) Prior Publication Data

US 2012/0310884 A1    Dec. 6, 2012

(51) Int. Cl.
*G06F 17/30* (2006.01)
*G06F 17/00* (2006.01)

(52) U.S. Cl.
USPC ........... 707/627; 713/165; 713/166; 713/167; 713/168; 713/169; 713/170; 713/171; 713/189; 726/2; 726/3; 726/4; 726/5; 726/6; 709/226; 709/224; 709/230

(58) Field of Classification Search
USPC ........... 707/627; 713/165–171, 189; 726/2–6; 709/226, 224, 230
See application file for complete search history.

(56) References Cited

U.S. PATENT DOCUMENTS

| 6,944,662 | B2 | 9/2005 | Devine et al. |
| 6,993,534 | B2 | 1/2006 | Denesuk et al. |
| 7,178,099 | B2 | 2/2007 | Meyer et al. |
| 7,383,253 | B1 | 6/2008 | Tsimelzon et al. |
| 7,552,109 | B2 | 6/2009 | Balasubramanian et al. |
| 7,584,377 | B2 | 9/2009 | Pellegrino et al. |
| 7,627,432 | B2 | 12/2009 | Wilkinson |
| 7,680,937 | B2 * | 3/2010 | Miller et al. ................ 709/226 |
| 7,769,806 | B2 | 8/2010 | Wie et al. |
| 7,792,828 | B2 | 9/2010 | Roegner |
| 7,908,281 | B2 | 3/2011 | Marceau et al. |
| 7,934,066 | B2 | 4/2011 | Mu et al. |
| 8,103,870 | B2 * | 1/2012 | Clower et al. ................ 713/161 |
| 8,176,334 | B2 * | 5/2012 | Vainstein ................ 713/189 |
| 2007/0073695 | A1 | 3/2007 | Conlan et al. |

(Continued)

FOREIGN PATENT DOCUMENTS

| EP | 2718802 | 4/2014 |
| WO | WO02086769 | 10/2002 |
| WO | WO2012170050 | 12/2012 |

OTHER PUBLICATIONS

Dong Yuan et al. "On-demand minimum cost benchmarking for intermediate dataset storage in scientific cloud workflow systems," Journal of Parallel and Distributed Computing, Feb. 2011. vol. 71, No. 2, pp. 316-332. [Accessed May 27, 2011—ScienceDirect via EbscoHost] http://www.sciencedirect.com/science/article/pii/S0743731510001838.

(Continued)

*Primary Examiner* — Yicun Wu
(74) *Attorney, Agent, or Firm* — Carr & Ferrell LLP

(57) ABSTRACT

Systems and methods for publishing datasets are provided herein. According to some embodiments, methods for publishing datasets may include receiving a request to publish a dataset to at least one of an internal environment located within a secured zone and an external environment located outside the secured zone, the request comprising at least one selection criteria, selecting the dataset based upon the at least one selection criteria, the dataset being selected from an index of collected datasets, and responsive to the request, publishing the dataset to at least one of the internal environment and the external environment.

13 Claims, 3 Drawing Sheets

(56) References Cited

U.S. PATENT DOCUMENTS

| | | |
|---|---|---|
| 2010/0106678 A1 | 4/2010 | Pietrek et al. |
| 2010/0118794 A1 | 5/2010 | Horn et al. |
| 2010/0161561 A1 | 6/2010 | Moore et al. |
| 2010/0205153 A1 | 8/2010 | Lamm |
| 2010/0306524 A1 | 12/2010 | Runkis et al. |
| 2010/0332479 A1 | 12/2010 | Prahlad et al. |
| 2011/0004590 A1 | 1/2011 | Lilley et al. |
| 2011/0110568 A1 | 5/2011 | Vesper et al. |
| 2011/0119198 A1 | 5/2011 | Courson et al. |
| 2013/0132344 A1 | 5/2013 | Tennant |

OTHER PUBLICATIONS

Yu et al. "Securely Sharing Data in Encrypted Databases," Computer Supported Cooperative Work in Design, 2006. CSCWD '06. 10th International Conference on , pp. 1-6. [Accessed May 27, 2011—IEEExplore] http://ieeexplore.ieee.org/xpl/freeabs_all.jsp?arnumber=4019137.

Hacigumus et al. "Executing SQL over encrypted data in the database-service-provider model," Proceedings of the 2002 ACM SIGMOD international conference on Management of data (SIGMOD '02). [Accessed May 27, 2011—ACM Digital Library via Google] http://portal.acm.org/citation.cfm?id=564717.

Wang et al. "A Dynamic Access Control Scheme for Outsourced Database." Proc. of The 2011 International Conference on Multimedia and Signal Processing, Guilin, China [Accessed May 27, 2011—Google].

Google Search, "Secure Documents Internal External." http://scholar.google.com/scholar?hl=en&q=secure+documents+internal+external&as_std . . . [Accessed on May 6, 2013.].

International Search Report and Written Opinion mailed Dec. 16, 2011 in Patent Cooperation Treaty Application No. PCT/US2011/046021, filed Jul. 29, 2011.

\* cited by examiner

SYSTEMS AND METHODS FOR PUBLISHING DATASETS

FIELD OF THE TECHNOLOGY

The present technology relates generally to systems and methods for information review and analysis, and more specifically, but not by way of limitation, to systems and methods for publishing datasets.

BACKGROUND

According to some embodiments, the systems and methods provided herein may be configured to index and/or collect and publish datasets. As background, electronic discovery, regulatory and investigative processes involve sensitive document review and analysis processes which often involve numerous time consuming and error prone steps associated with the gathering of relevant datasets in a legally defensible manner.

Dataset collection, review, and analysis often begins with the filing of a lawsuit, commencement of an investigation or other significant event that requires the review and analysis of certain types of datasets. These datasets may include many diverse of similar data formats associated with user created files, electronic mail, audio, video, and the like. Datasets may be collected and analyzed from a variety of document sources such as email systems and repositories, file shares, storage media, third party web sites/services, and so forth. Because document review and analysis processes rely heavily on manual human action for certain steps, such as and the publishing of the collected and processed data to document review location, these processes are often error prone and time consuming. For example, datasets may be mistakenly omitted (i.e., not collected or improperly reviewed), leading to costly errors.

In some instances, the collected datasets may be published to a virtual segregated document review environment or other secure document review construct that provides a secure location for the review and analysis of the collected datasets. These segregated document review environments provide a location (either secured or unsecured) where dataset review personnel may analyze and evaluate datasets that have been identified and selected for review.

SUMMARY OF THE TECHNOLOGY

According to some embodiments, the present technology may be directed to methods for publishing datasets. The methods may comprise: (a) receiving a request to publish a dataset to at least one of an internal environment located within a secured zone and an external environment located outside the secured zone, the request comprising at least one selection criteria; (b) selecting the dataset based upon the at least one selection criteria, the dataset being selected from an index of collected datasets; and (c) responsive to the request, publishing the dataset to at least one of the internal environment and the external environment.

According to additional exemplary embodiments, the present technology may be directed to an early case assessment system for publishing datasets. These systems may include: (a) a memory for storing executable instructions for publishing datasets; (b) a processor for executing the instructions stored in memory, the executable instructions comprising: (1) a core gather module that receives requests to publish a dataset to at least one of an internal environment located within a secured zone of the early case assessment system and an external environment located outside the secured zone, the request comprising at least one selection criteria; and (2) a core analysis module communicatively coupled to the core gather module that (i) selects the dataset based upon a request received by the core gather module, the dataset assembly module selecting the dataset from an index of collected datasets based upon the at least one selection criteria; and (ii) publishes the dataset to at least one of the internal environment and the external environment based upon a request received by the core gather module.

DETAILED DESCRIPTION OF EXEMPLARY EMBODIMENTS

Figure 1:
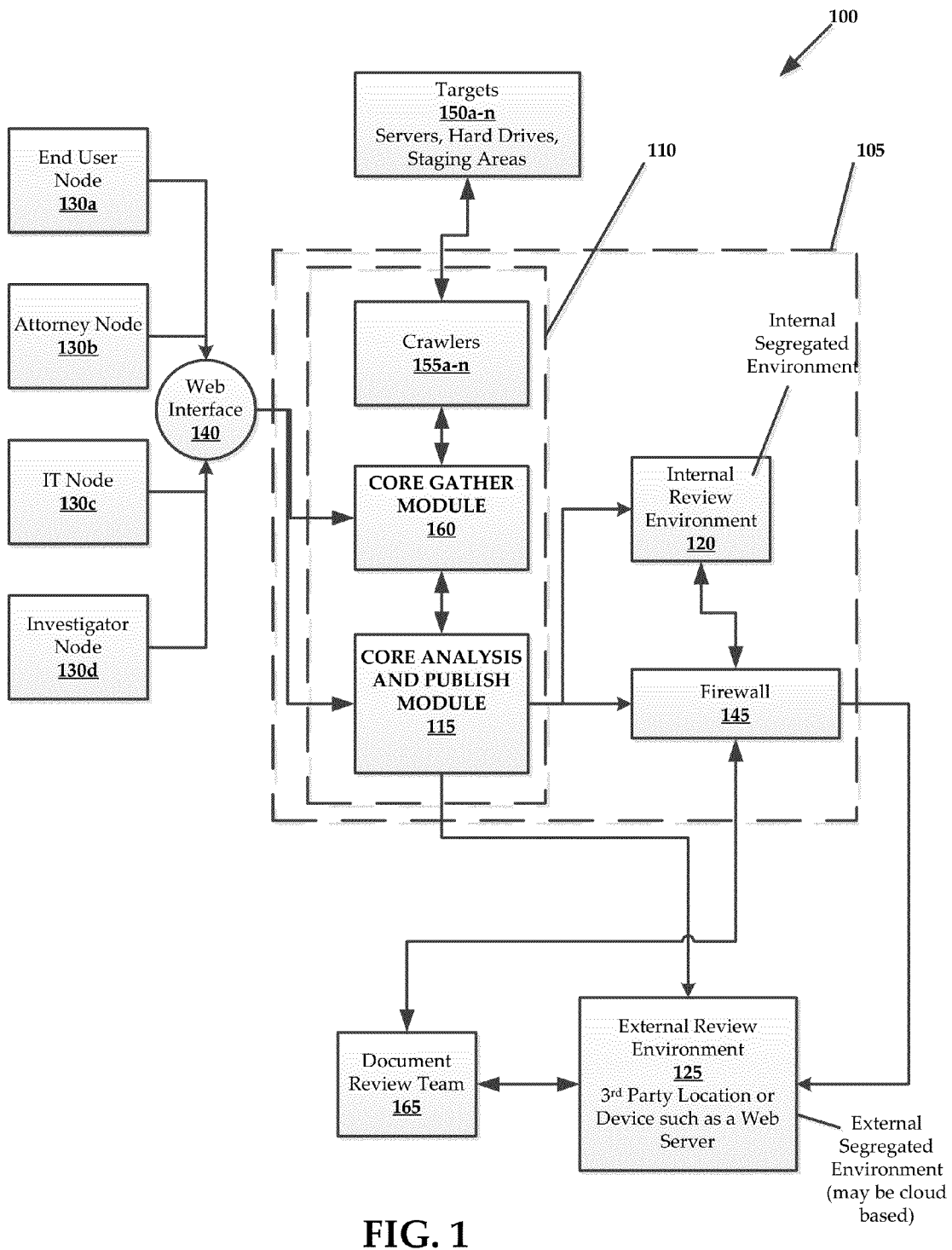
FIG. 1 is a schematic diagram of an exemplary architecture of a system for publishing datasets. The system may be utilized to practice aspects of the present technology.

While this technology is susceptible of embodiment in many different forms, there is shown in the figures and will herein be described in detail several specific embodiments with the understanding that the present disclosure is to be considered as an exemplification of the principles of the technology and is not intended to limit the technology to the embodiments illustrated.

Generally speaking, the systems provided herein may include electronic dataset review systems that identify, process, and publish datasets (e.g., documents, electronic mail, and so forth) from a variety of data sources such as an enterprise email server, document repositories, and the like. All datasets identified and/or collected comprise a corpus of reviewable datasets that are available for analysis and/or review. According to some embodiments, each dataset may be crawled and processed by the system according to guidelines established for the system by one or more dataset review administrators.

The systems and methods provided herein may automatically and continuously review datasets as they become available. It will be understood that the term "review" may be understood to include additional functions such as analyze, organize, enrich, prioritize, code, batch, and so forth. Datasets may be evaluated for keywords, concepts or other metadata that define the content or subject matter of the dataset and potential relevance of individual pieces of data. For example, the system may determine keywords in the body of a particular electronic mail communication. The subject matter of the email communication may be inferred from the occurrence of particular words or phrases or combinations thereof within the dataset. In some embodiments, the system may utilize any one of a number of algorithms to process and evaluate the subject matter and content of the datasets and their associated metadata to create an index of collected datasets according to the parameters set by the user. For example, email communications may be parsed for terms, dates, subject matter, email addresses, and the like. These terms are then associated with the email communication in the index such that searching the index for a term that is included in the email will yield the email as a search result.

Upon the occurrence of a triggering event (e.g., commencement of a lawsuit, investigation or other similar event), system users may search the index of datasets for relevant documents according to criteria. Criteria may include keyword searching, filtering according to parameters, and so forth. Once relevant data have been determined from the index and/or original location, the system may copy the relevant datasets from index and publish the same to a document review location.

According to some embodiments, the document review location may include a virtual segregated document review environment, a secure document review location within the system, and/or a third party document review location. For example, the relevant documents may be communicated to the computing system of the user, the computing system of the user's legal counsel, to regulatory bodies, or the relevant documents may be retained for review and analysis within the system itself.

It is noteworthy to mention that the more frequently a dataset is communicated between computing systems, the more likely that the dataset may be subject to unwanted exposure to third parties. Therefore, sensitive datasets may be retained within a secure zone of the system, or secure communications protocols may be established for accessing the datasets if they are published outside the secure zone of the system.

FIG. 1 illustrates an exemplary architecture 100 that may include an early case assessment system, hereinafter "system 105" that, in turn, includes a data collection module 110, a core analysis and publish module 115, an internal review environment 120, and an external review environment 125, can be utilized as a part of the early case assessment system, system 105, or as an external review environment to which data is published from the early case assessment system 105. It is noteworthy that the system 105 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the system 105 may include separately configured web servers.

Generally speaking, the system 105 may communicatively couple with any one of a plurality of client devices such as an end user node 130a, an attorney node 130b, an IT node 130c, and an investigator node 130d. While these nodes represent descriptive or exemplary end user client devices, one of ordinary skill in the art will appreciate that many other types of client device nodes may likewise be utilized in accordance with the present technology. It is further noteworthy to mention that each of the nodes 130a-d may include an end user computing system such as computing system 300, which will be described in greater detail with reference to FIG. 3.

Each of the nodes 130a-d may communicatively couple with the system 105 via any of a private and/or public communications network such as the Internet.

According to some embodiments, the system 105 may include a cloud based computing environment that collects, processes, analyzes, and publishes datasets. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers s with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

The system 105 may generate a variety of graphical user interfaces that allow end users to interact with the system 105. For example, the system may generate a web interface 140 that allows end users to enter search queries for searching indexes, establish dataset collection criteria, or automatically obtain and publish datasets to at least one of an internal document review location, such as an internal review environment 120, and an external review environment 125. It is noteworthy to mention that the external review environment 125 may be located outside a firewall 145 of the system 105. As such, accessing datasets published to the internal review environment 120 may require the use of security credentials (e.g., secure communication protocols) to gain access through the firewall 145.

It will be understood that components or modules behind the firewall 145 of the system 105 may be referred to as being located within a "secure zone" of the system 105. For example, the internal review environment 120 may be understood as being located within the secure zone because it is located behind the firewall 145, or other suitable security devices, systems, or processes. In contrast, the external review environment 125 may be understood to be outside the secure zone of the system 105 because the external review environment 125 is located outside the firewall 145.

The web interface 140 may be accessed by a web browser application of any of the nodes 130a-d, or may be accessed by an application resident on a mobile device such as a smartphone.

Data collection software or modules that may communicatively couple with the data collection module 110 may be installed on, and reside on the computing systems of the client (e.g., the entity for which datasets are to be collected), such as targets 150a-n. In other embodiments, the data collection module 110 may utilize one or more crawlers 155a-n that may communicatively couple with the targets 150a-n to receive datasets therefrom. The communication of datasets from targets 150a-n to the data collection module 110 may occur automatically and continuously over time (e.g., synchronously), or may occur in batches (e.g., asynchronously). The term "target" may be understood to include any data source such as an email repository, storage media, and so forth.

As datasets are located by the crawlers 155a-n, the core analysis and publish module 115 of the data collection module 110 may create an index of the received datasets and associated meta-data and then apply one or more algorithms to process and evaluate the subject matter and content of the datasets and their associated metadata and to create an index of collected datasets, as described above. For example, these evaluative algorithms may determine information such as keywords, dates, times, and other pertinent information included in the dataset. The core analysis and publish module 115 may also analyze the metadata of the dataset.

The core gather module 160 may establish and maintain individual indexes for each of targets 150*a-n*, or may utilize one index for each client that includes information for each target 150*a-n* of the client.

Additionally, the core gather module 160 may store the collected datasets in a storage medium (not shown) communicatively coupled with the system 105.

Upon the occurrence of a triggering event, a user may interact with the system 105 via their client device, such as end user node 130*a*. That is, users may access the system 105 via the web interface 140 utilizing their end user node 130*a*. Users may review, analyze and code relevant datasets by first searching or analyzing filtered datasets from an index or a combination of indexes.

For example, the end user may desire to locate all datasets that mention a particular keyword or group of keywords or relate to a particular concept. The core gather module 160 of the system 105 may compare the query to the index to locate and obtain relevant datasets that correspond to received queries.

In some embodiments, the core analysis and publish module 115 may make a copy of the index or indexes and select datasets before obtaining the datasets for publishing. Additionally, the core gather module 160 may lock each selected dataset to prevent tampering or modification to the datasets. Moreover, the core gather module 160 may utilize any other necessary protective or security related procedures to ensure that the datasets are obtained and maintained in a legally defensible manner.

After selecting the desired datasets, the core analysis and publish module 115 may prepare the datasets for export or publishing to a document review or analysis location by encapsulating the datasets into files and combining the datasets into batches. In other embodiments, datasets may be published in their raw or native format.

When the core analysis and publish module 115 has prepared the datasets for publishing, the core analysis and publish module 115 may publish the datasets to at least one of the internal review environment 120 and the external review environment 125.

According to some embodiments, the core analysis and publish module 115 may publish the datasets to a document review location via any one of a number of methods. For example, the core analysis and publish module 115 may publish the datasets by uploading the datasets via a file transfer protocol ("FTP"), or other computer networking protocol to one of the aforementioned locations. In other embodiments, the core analysis and publish module 115 may publish the datasets to a third party location, such as the external review environment 125. In additional embodiments, the core analysis and publish module 115 may stream the datasets to the desired review location, either in batches or as individual datasets.

As stated previously, the core analysis and publish module 115 may publish the datasets to an external review environment 125 that exists beyond or outside of the firewall 145 of the system 105. Exemplary external nodes may include, but are not limited to, a web server or storage media associated with a user's web server or a third party web-based destination per the user's selection, and so forth.

It is noteworthy to mention that, because the system 105 indexes datasets on a periodic or continual basis, requests to obtain and publish datasets may result in the system 105 automatically obtaining datasets from the corpus of available datasets without need for further evaluation of the datasets. That is, the system 105 may pre-analyze and indexes the datasets prior to the occurrence of a triggering event such that upon the occurrence of a triggering event, the datasets are easily and seamlessly obtained (should it meet certain defined parameters or criteria) and published to the appropriate document review location(s).

Assuming datasets have been published to an external review environment 125, a document review team 165 may access the datasets within the environment or may transfer the datasets from the environment for use on a local computing system. It will be understood that the document review team 165 may include a plurality of individual computing systems. The document review team 165 may access the external review environment 125 utilizing secure communications protocols, although in some embodiments, the document review team 165 may access the external review environment 125 without the requirement of a secure communications path. This scenario is more common when the datasets do not include sensitive information such as credit card data, social security numbers, or health record data.

Alternatively, users may access datasets via the internal review environment 120 from a web based interface, such as web interface 140, or by way of an additional review application (not shown) that may reside within a cloud based computing environment.

It will be understood that according to some embodiments, the external review environment 125 may include a cloud based computing environment that is configured to store selected and published datasets. The datasets may be stored in the cloud computing environment in virtual storage media or physical storage media that are distributed across a plurality of web servers.

Figure 2:
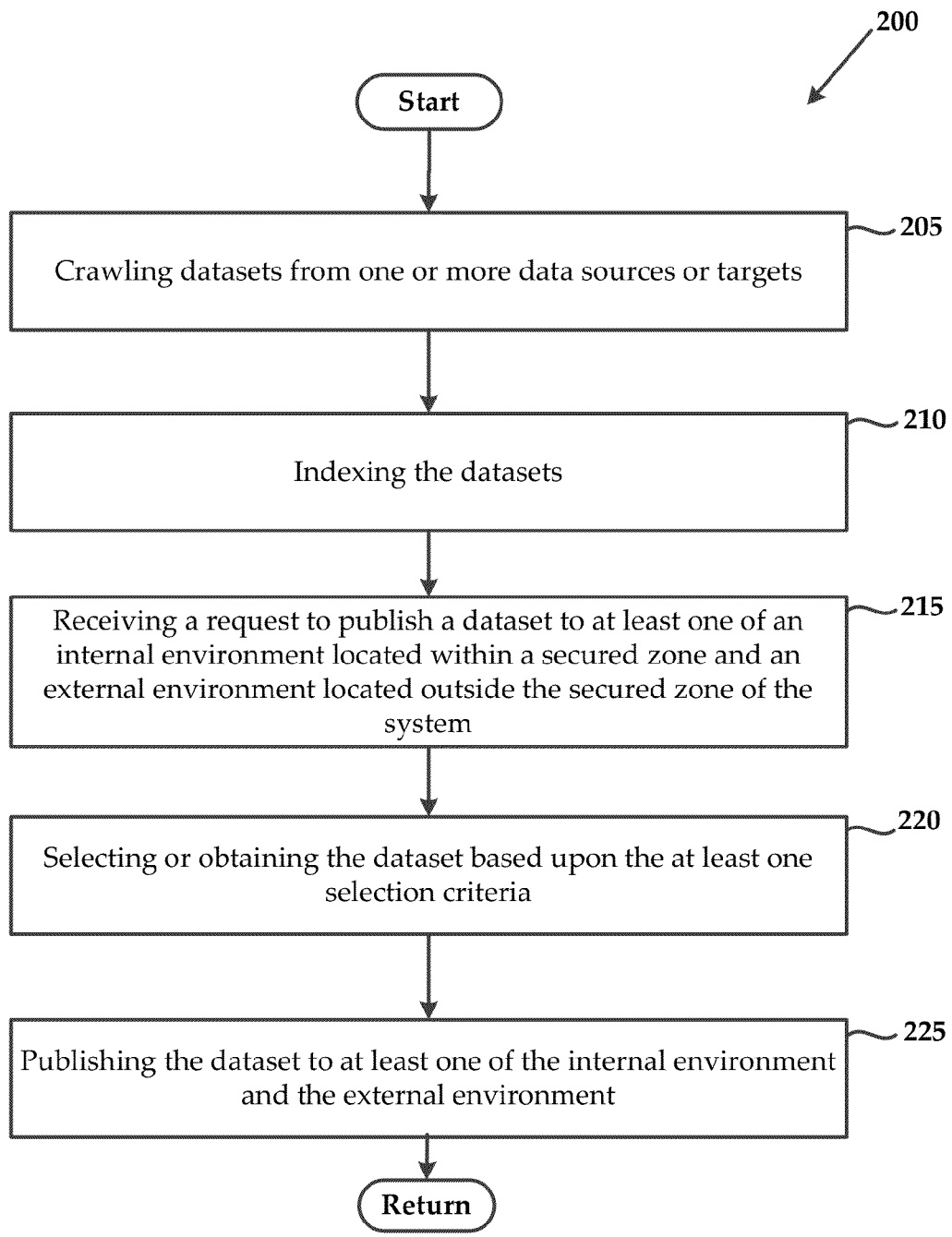
FIG. 2 is an exemplary flow diagram of a method for publishing datasets.

FIG. 2 illustrates a flowchart of an exemplary method 200 for publishing a dataset. The method may begin with the step 205 of crawling (or otherwise parsing, evaluating, analyzing, and so forth) the datasets from one or more data sources or targets. As datasets are crawled, the method may include a step 210 of indexing the datasets. Indexing of datasets may include applying statistical or analytical algorithms or other mechanisms for determining the subject matter and/or content of the crawled datasets. Keywords, dates, times, and other descriptive information relative to the datasets may be stored in the index and associated with the datasets from which they were extracted.

Upon the occurrence of a triggering event (such as the commencement of a lawsuit), the method may include a step 215 of the system receiving a request to publish a dataset to at least one of an internal environment located within a secured zone and an external environment located outside the secured zone of the system.

Next, the method may include the step 220 of selecting or obtaining the dataset based upon the at least one selection criteria. It is noteworthy to mention that the dataset may be selected from the index of collected datasets that is maintained by the system.

After the selection of datasets, the method may include a step 225 of publishing the dataset to at least one of the internal environment and the external environment. The method 200 may then return to step 205 in anticipation of an additional triggering event.

It will be understood that in some embodiments, the method may include additional or fewer steps. For example, other exemplary methods may include only the steps of receiving requests, selecting datasets, and publishing the selected datasets.

It is noteworthy to mention that in alternative embodiments, the system may collect and/or store datasets from one or more targets before the datasets are indexed by the system.

Figure 3:
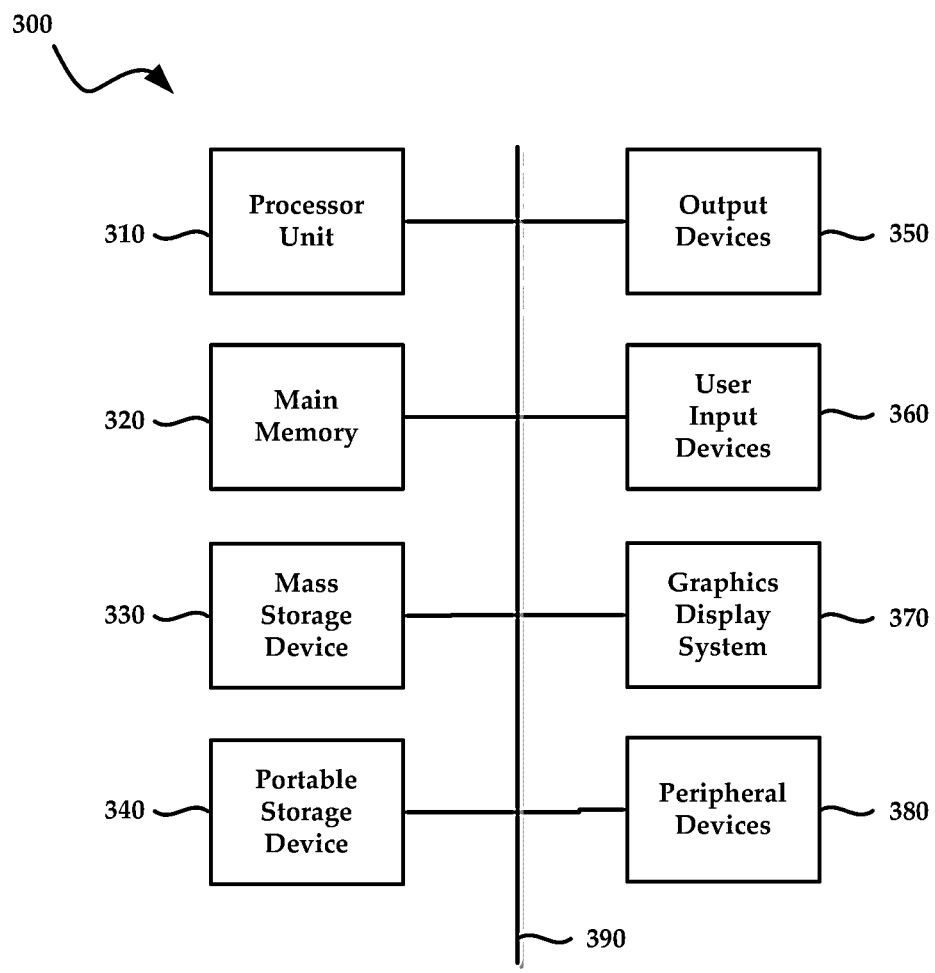
FIG. 3 is a block diagram of an exemplary computing system that may be utilized to practice aspects of the present disclosure.

FIG. 3 illustrates an exemplary computing system 300 that may be used to implement an embodiment of the present technology. The computing system 300 of FIG. 3 includes one or more processor units 310 and main memory 320. Main memory 320 stores, in part, instructions and data for execution by processor unit 310. Main memory 320 can store the executable code when the computing system 300 is in operation. The computing system 300 of FIG. 3 may further include a mass storage device 330, portable storage devices 340, output devices 350, user input devices 360, a graphics display system 370, and other peripheral devices 380.

The components shown in FIG. 3 are depicted as being connected via a single bus 390. The components may be connected through one or more data transport means. Processor unit 310 and main memory 320 may be connected via a local microprocessor bus, and the mass storage device 330, peripheral device(s) 380, portable storage device(s) 340, and graphics display system 370 may be connected via one or more input/output (I/O) buses.

Mass storage device 330, which may be implemented with a magnetic disk drive or an optical disk drive, is a non-volatile storage device for storing data and instructions for use by processor unit 310. Mass storage device 330 can store the system software for implementing embodiments of the present technology for purposes of loading that software into main memory 320.

Portable storage device 340 operates in conjunction with a portable non-volatile storage media, such as a floppy disk, compact disk or digital video disc, to input and output data and code to and from the computing system 300 of FIG. 3. The system software for implementing embodiments of the present technology may be stored on such a portable media and input to the computing system 300 via the portable storage device 340.

User input devices 360 provide a portion of a user interface. User input devices 360 may include an alphanumeric keypad, such as a keyboard, for inputting alphanumeric and other information, or a pointing device, such as a mouse, a trackball, stylus, or cursor direction keys. Additionally, the computing system 300 as shown in FIG. 3 includes output devices 350. Suitable output devices include speakers, printers, network interfaces, and monitors.

Graphics display system 370 may include a liquid crystal display (LCD) or other suitable display device. Graphics display system 370 receives textual and graphical information, and processes the information for output to the display device.

Peripheral devices 380 may include any type of computer support device to add additional functionality to the computing system 300. Peripheral device(s) 380 may include a modem or a router.

The components contained in the computing system 300 of FIG. 3 are those typically found in computer systems that may be suitable for use with embodiments of the present technology and are intended to represent a broad category of such computer components that are well known in the art. Thus, the computing system 300 of FIG. 3 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable media). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage media" and "computer-readable storage media" as used herein refer to any media or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method for publishing datasets, comprising:
   receiving a request to publish a dataset to at least one of an internal environment located within a secured zone and an external environment located outside the secured zone, the request comprising at least one selection criteria;
   selecting, by a processor, the dataset based upon the at least one selection criteria, the dataset being selected from an index of collected datasets, the index of collected datasets being formed by parsing communications for at least one of terms, dates, subject matters, and email addresses; and
   responsive to the request, publishing the dataset to at least one of the internal environment and the external environment, creating a copy of the index of collected datasets, and selecting the dataset from the copy of the index of collected datasets, the publishing including at least one of:
   encapsulating the dataset into one or more files and transmitting the one or more files to the internal environment;

grouping the dataset into one or more batches and transmitting the one or more files to the internal environment; and
streaming the dataset to the internal environment.

2. The method according to claim 1, further comprising:
collecting datasets from a plurality of data sources;
indexing the collected datasets to create the index of collected datasets; and
storing the collected datasets in a storage medium.

3. The method according to claim 1, wherein:
the request received is to publish the dataset to the internal environment; and
the publishing of the dataset is to the internal environment.

4. The method according to claim 1, wherein:
the request received is to publish the dataset to the external environment; and
the publishing of the dataset is to the external environment.

5. The method according to claim 1, wherein the index of collected datasets includes terms associated with communications in the collected datasets.

6. The method according to claim 1, wherein searching the index for a term yields communications in the collected dataset having the term.

7. An early case assessment system for publishing datasets, comprising:
a memory for storing executable instructions for publishing datasets;
a processor for executing the instructions stored in memory, the executable instructions comprising:
a core gather module that receives a request to publish a dataset to at least one of an internal environment located within a secured zone of the early case assessment system and an external environment located outside the secured zone, the request comprising at least one selection criteria; and
a core analysis module communicatively coupled to the core gather module that:
selects the dataset based upon the request received by the core gather module, the dataset being selected from an index of collected datasets based upon the at least one selection criteria, the index of collected datasets being formed by parsing communications for at least one of terms, dates, subject matters, and email addresses;
publishes the dataset to at least one of the internal environment and the external environment based upon the request received by the core gather module, the publishing including at least one of:
encapsulating the dataset into one or more files and transmitting the one or more files to the external environment;
grouping the dataset into one or more batches and transmitting the one or more files to the external environment; and
streaming the dataset to the external environment;
creates a copy of the index of collected datasets; and
selects the dataset from the copy of the index of collected datasets based upon receipt of the request to publish the dataset by the core gather module.

8. The early case assessment system according to claim 7, wherein the core gather module collects datasets from a plurality of data sources and the core analysis module indexes the collected datasets to create the index of collected datasets and stores the collected datasets in a storage medium.

9. The early case assessment system according to claim 7, wherein the external environment that is located outside the secured zone includes a cloud computing system communicatively couplable to the core analysis module of the system.

10. The early case assessment system according to claim 7, wherein:
the request received by the core gather module is to publish the dataset to the internal environment; and
the core analysis module publishes the dataset to the internal environment.

11. The early case assessment system according to claim 7, wherein:
the request received by the core gather module is to publish the dataset to the external environment; and
the core analysis module publishes the dataset to the external environment.

12. The early case assessment system according to claim 7, wherein the index of collected datasets includes terms associated with communications in the collected datasets.

13. The early case assessment system according to claim 7, wherein searching the index for a term yields communications in the collected dataset having the term.

* * * * *